Jan. 23, 1951 G. L. CLAYBOURN 2,539,184
BATTERY TRUCK FOR METAL-CLAD SWITCHGEARS
Filed Aug. 19, 1948 2 Sheets-Sheet 1

WITNESSES:

INVENTOR
Glen L. Claybourn.
BY
ATTORNEY

Jan. 23, 1951 G. L. CLAYBOURN 2,539,184
BATTERY TRUCK FOR METAL-CLAD SWITCHGEARS
Filed Aug. 19, 1948 2 Sheets-Sheet 2
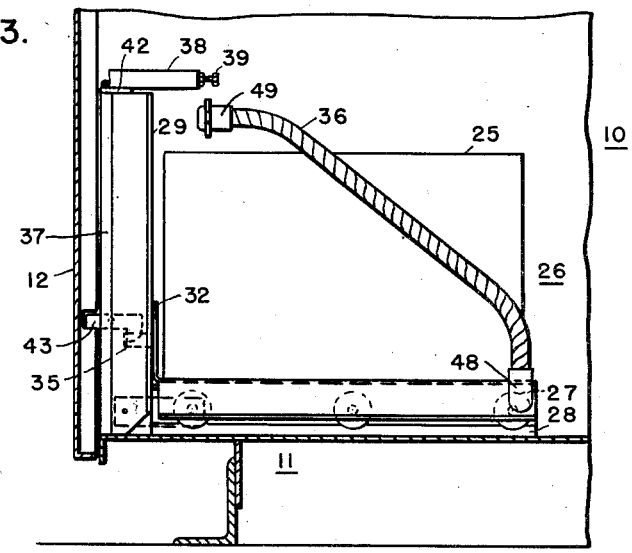
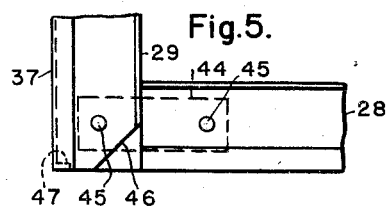
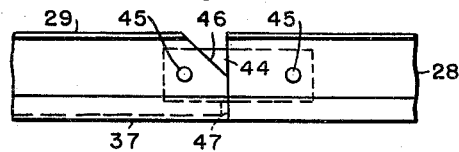
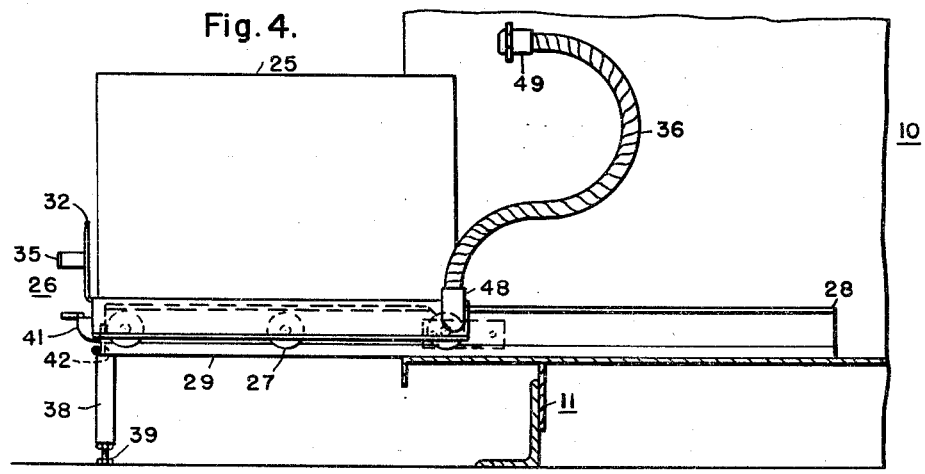
WITNESSES:
INVENTOR
Glen L. Claybourn.
BY
ATTORNEY Patented Jan. 23, 1951

2,539,184

UNITED STATES PATENT OFFICE 2,539,184

BATTERY TRUCK FOR METAL-CLAD SWITCHGEARS

Glen L. Claybourn, Pittsburgh, Pa., assignor to Westinghouse Electric Corporation, East Pittsburgh, Pa., a corporation of Pennsylvania Application August 19, 1948, Serial No. 45,092

3 Claims. (Cl. 175—307)

My invention relates, generally, to metal-clad switchgear and, more particularly, to battery trucks for metal-clad switchgear of the enclosed unit type.

It is customary to provide a storage battery for supplying power for operating the control apparatus enclosed in metal-clad switchgear. Frequently the battery is so located in the switchgear housing that it is not readily accessible for servicing, thereby resulting in the battery being neglected during scheduled maintenance periods.

An object of my invention is to provide a battery servicing truck which permits the battery to be readily removed from a switchgear housing unit to an accessible location for servicing the battery.

Another object of my invention is to provide a combined rail extension support and protective panel for the battery.

Still another object of my invention is to provide for securely latching the battery in the operating position and in the servicing position.

A further object of my invention is to provide for maintaining the electrical connections to the battery during the servicing operation.

A more general object of my invention is to provide a battery servicing truck which shall be simple and efficient in operation and which may be economically manufactured and installed.

Other objects of my invention will be explained fully hereinafter or will be apparent to those skilled in the art.

In accordance with one embodiment of my invention, the battery for a metal-clad switchgear unit is mounted on a truck which rolls on rails fixed in the housing and on rail extensions secured to a hinged panel. The panel may be lowered to a horizontal position to support the battery when it is withdrawn from the housing for servicing. The panel may be latched in a vertical position to protect the battery and retain it in the operating position.

For a better understanding of the nature and objects of my invention, reference may be had to the following detailed description, taken in conjunction with the accompanying drawings, in which:

Fig. 3 is an enlarged view, partially in section and partially in side elevation, of a portion of the switchgear structure with the battery in the operating position in the housing;

Fig. 4 is a view, similar to Fig. 3, with the battery in the servicing position, and Figs. 5 and 6, are enlarged detail views showing the manner of connecting the rail extensions to the fixed rails.

Figure 1:
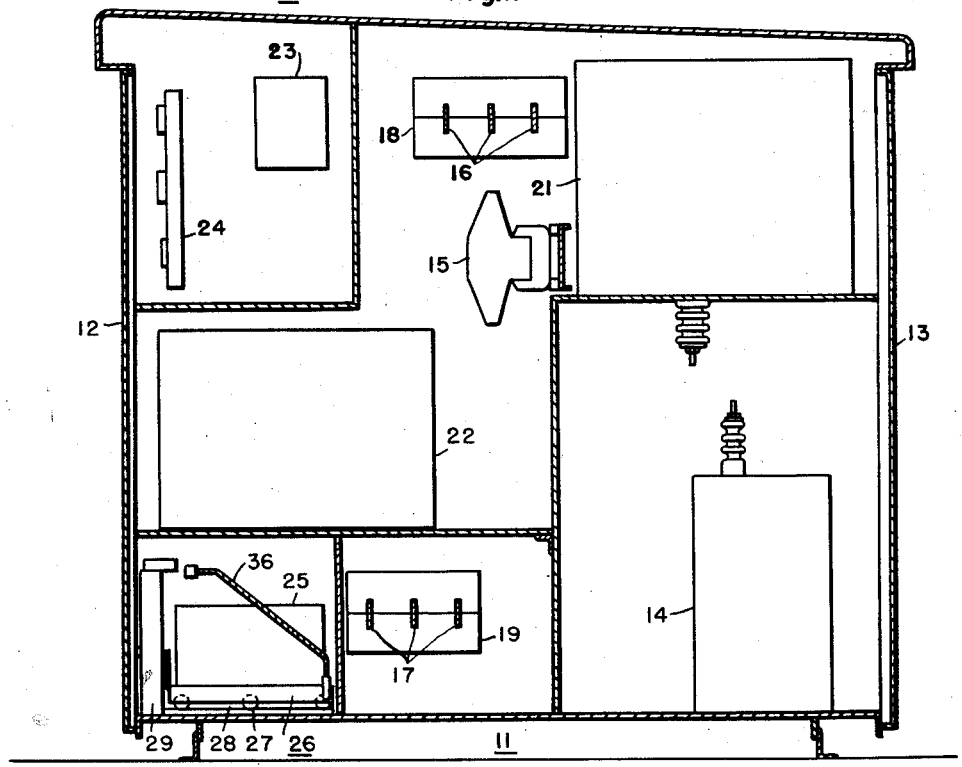
Fig. 1 is a view, in section, of a metal-enclosed switchgear structure embodying the principal features of my invention.

Referring to the drawings, and particularly to Fig. 1, the switchgear structure shown therein comprises a metal-enclosed housing unit 10 which is supported on a base structure 11. The housing unit 10 may be of the type disclosed in the copending application of G. L. Claybourn and Paul Kocsis, Jr., Serial No. 783,170, filed October 30, 1947.

As shown, the housing unit is provided with a hinged door 12 at the front and a similar door 13 at the rear. The housing unit is divided into a plurality of compartments which contain switchgear apparatus such as a power transformer 14, a current transformer 15, bus bars 16 and 17, which are mounted in suitable supports 18 and 19 respectively, a housing 21 which contains fuses for the transformer 14, a housing 22 which contains a potential transformer, a battery charger 23, a control panel 24, and a storage battery 25 for supplying power for operating the control apparatus.

As explained hereinbefore it is desirable that the battery 25 be made accessible for servicing the battery. In order to accomplish this result, the battery 25 is mounted on a removable truck 26 having wheels 27 which run on rails 28 fixed in the housing 10 and rail extensions 29 which are hinged to the fixed rails 28. The battery 25 may be withdrawn from the housing 10 to an accessible position by opening the door 12, lowering the rail extensions 29, and pulling the truck 26 forwardly onto the rail extensions 29.

Figure 2:
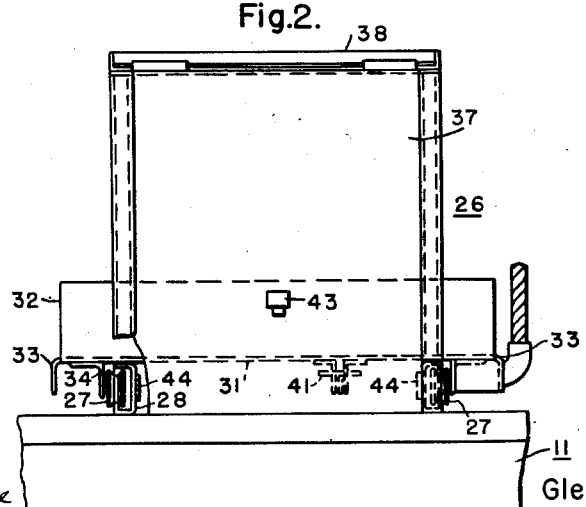
Fig. 2 is an enlarged view, in front elevation, of the battery servicing truck and rail extension supporting panel.

As shown most clearly in Figs. 2, 3, and 4, the battery truck 26 comprises a base 31 having an upwardly turned apron 32 at its front and downwardly turned side aprons 33. The wheels 27 are attached to the base 31 by angle members 34. As shown in Fig. 4, a handle 35 is attached to the front apron 32 for withdrawing the truck from the housing.

As shown in Figs. 3 and 4, a flexible cable 36 has one end attached to a terminal connector 48 on the truck 26 and the other end secured to a terminal connector 49 in the housing 10. In this manner, the power is supplied from the battery 25 to the apparatus in the housing 10, the proper connections being made to a terminal board in the housing to which the cable 36 is connected.

In order to support the battery truck 26 when it is withdrawn from the housing 10, the rail extensions 29 may be welded to a panel 37 which may be lowered to the horizontal position shown in Fig. 4, a bracket 38 is hinged to the panel 37 and may be swung to the position shown in Fig. 4 to help support the weight of the battery 25. The bracket 38 may be provided with adjustable screws 39 which rest on the floor which supports the base 11 for the housing unit 10. The screws 39 may be adjusted to raise or lower the outer ends of the rail extensions 29. The truck 26 is provided with a latch 41 which engages a flange 42 on the panel 37 when the truck 26 is fully withdrawn to the servicing position.

When the truck 26 is inserted into the housing 10 to the operating position, the panel 37 and the rail extensions 29 are raised to the vertical position shown in Fig. 3. The bracket 38 may be swung inwardly to the horizontal position shown, thereby permitting the door 12 to be closed. A latch 43 is provided on the panel 37 for engaging the handle 35 on the truck 26 when the panel 37 is raised to the vertical position. In this manner, the panel is secured in the vertical position, thereby retaining the battery 25 in the operating position and protecting the battery while in operation.

As shown most clearly in Figs. 5 and 6, the rail extensions 29 are pivotally connected to the fixed rails 28 by tie-bars 44 which span the joint between the abutting ends of the fixed rails 28 and the rail extensions 29. The tie-bars 44 are pivotally attached to the rails 28 and rail extensions 29 by pins 45 which extend through each tie-bar and its associated rails. As shown, the one end of each rail extension is beveled at 46 and the double pivoted tie-bar 44 permits the rail extension to raise when it is being moved from the vertical to the horizontal position or vice versa, thereby permitting the rail extensions to be raised or lowered without binding and at the same time ensuring that the ends of the rail extensions 29 are securely butted against the ends of the fixed rails 28 when in the horizontal position.

As also shown in Figs. 5 and 6, the lower edge of the panel 37 is provided with a flange 47 which presses against the bottom edges of the tie-bars 44 when the panel 37 and the rail extensions 29 are in the horizontal position. Referring to Fig. 6, it will be seen that the flange 47 engages the tie-bar 44 at a point between the two pivot pins 45. In this manner, the flange 47 functions to lock the toggle mechanism and help support the weight of the battery 25.

From the foregoing description it is apparent that I have provided for maintaining the electrical connections between the storage battery and its connected apparatus while the battery is being serviced and at the same time have provided for removing the battery from a relatively inaccessible position in the switchgear unit housing to an accessible position for servicing. The supporting structure for the battery has sufficient strength to support the weight of a relatively heavy battery, but is of a relatively simple construction.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In switchgear apparatus, in combination, a metal-enclosed housing, rails fixed in said housing, a battery truck having wheels disposed on said rails, extension rails having ends abutting ends of the fixed rails, tie bars having one end pivotally connected to the fixed rails and the other end pivotally connected to the extension rails, and a panel secured to the extension rails, said panel having a flange engaging the lower edges of said tie bars between the pivotal connections for the tie bars when the panel is in a horizontal position.

2. In switchgear apparatus, in combination, a metal-enclosed housing, rails fixed in said housing, a battery truck having wheels disposed on said rails, extension rails having ends abutting ends of the fixed rails, tie bars spanning the abutting ends of said rails and pivotally secured thereto, and a panel secured to the extension rails, said panel having a flange engaging the lower edges of said tie bars between the pivot points for the tie bars when the panel is in a horizontal position.

3. In switchgear apparatus, in combination, a metal-enclosed housing, rails fixed in said housing, a battery truck having wheels disposed on said rails, extension rails having ends abutting ends of the fixed rails, tie bars spanning the abutting ends of said rails and pivotally secured thereto, and a panel secured to the extension rails, said panel having a flange engaging the lower edges of said tie bars between the pivot points for the tie bars when the panel is in a horizontal position, the ends of the extension rails which abut the fixed rails having beveled corners.

GLEN L. CLAYBOURN.

REFERENCES CITED

The following references are of record in the file of this patent:

UNITED STATES PATENTS

| Number | Name | Date |
|---|---|---|
| 1,134,836 | Fortner | Apr. 6, 1915 |
| 1,280,225 | Holmquist | Oct. 1, 1918 |
| 2,128,149 | Linde | Aug. 23, 1938 |
| 2,264,755 | Johnson | Dec. 2, 1941 |
| 2,264,777 | Steiner | Dec. 2, 1941 |
| 2,365,555 | Johnson | Dec. 19, 1944 |
| 2,412,931 | West | Dec. 17, 1946 |